United States Patent
Zhu (10) Patent No.: US 9,158,796 B1
(45) Date of Patent: Oct. 13, 2015

(54) DATA SOURCE MODELING METHODS FOR HETEROGENEOUS DATA SOURCES AND RELATED COMPUTER PROGRAM PRODUCTS AND SYSTEMS

(71) Applicant: CA, Inc., Islandia, NY (US)

(72) Inventor: Jinbao Zhu, Beijing (CN)

(73) Assignee: CA, Inc., New York, NY (US)

( * ) Notice: Subject to any disclaimer, the term of this patent is extended or adjusted under 35 U.S.C. 154(b) by 221 days.

(21) Appl. No.: 13/793,530

(22) Filed: Mar. 11, 2013

(51) Int. Cl.
*G06F 17/30* (2006.01)

(52) U.S. Cl.
CPC .... *G06F 17/30289* (2013.01); *G06F 17/30587* (2013.01)

(58) Field of Classification Search
CPC .............. G06F 17/30539; G06F 17/30604; G06F 17/30587; G06F 17/30911; G06F 17/30997
USPC ............. 707/803, 804, 802, 810; 706/47
See application file for complete search history.

(56) References Cited

U.S. PATENT DOCUMENTS

| | | | |
|---|---|---|---|
| 7,603,327 B2* | 10/2009 | Esfahany | 706/15 |
| 7,620,623 B2* | 11/2009 | Harvey | 1/1 |
| 2004/0181541 A1* | 9/2004 | Groenendaal et al. | 707/100 |
| 2005/0160401 A1 | 7/2005 | Russo et al. | |
| 2005/0165724 A1 | 7/2005 | West | |
| 2008/0141215 A1 | 6/2008 | Elliman | |

OTHER PUBLICATIONS

Craig Boyd; "A Usability Comparison of the Top Three Data Modeling Tools"; MySoftForge; Jun. 2011; 11 pages.*
Jinbao Jhu et al. "Data Modeling for Big Data"; CA Technologies; 18 pages; Nov. 2012.*
"CA ERwin Data Modeler." *Wikipedia, The Free Encyclopedia.*, Wikimedia Foundation, Inc. Retrieved Feb. 6, 2013 from http://en.wikipedia.org/wiki/CA_ERwin_Data_Modeler, 3 pp.
"CA ERwin Modeling Family—Why trust your data to anyone else." *Insight.* Retrieved Feb. 6, 2013 from http://www.insight.com/content/insight/us/en/brands/ca-tech/ca-erwin.html, 2 pp.

(Continued)

*Primary Examiner* — Monica Pyo
(74) *Attorney, Agent, or Firm* — Myers Bigel Sibley & Sajovec, P.A.

(57) ABSTRACT

A method of generating a data source model may include defining a first interface for a first abstract sub-model of a first sub-model responsive to user input and defining a second interface for a second abstract sub-model of a second sub-model responsive to user input. A connection may be defined between the first interface and the second interface. First and second data source structure may be respectively defined for the first and second sub-models. After defining the first and second data source structures, a unified data source model may be generated including the first and second sub-models and having the respective first and second interfaces of the first and second abstract sub-models, with the first and second sub-models being coupled through the connection defined between the respective first and second interfaces of the first and second abstract sub-models.

15 Claims, 7 Drawing Sheets

(56) References Cited

OTHER PUBLICATIONS

"Data modeling." *Wikipedia, The Free Encyclopedia.*, Wikimedia Foundation, Inc. Retrieved Feb. 6, 2013 from http://en.wikipedia.org/wiki/Data_modeling, 10 pp.

"Entity-relationship model." *Wikipedia, The Free Encyclopedia.*, Wikimedia Foundation, Inc. Retrieved Feb. 6, 2013 from http://en.wikipedia.orq/wiki/%E2%80%93relationship_model, 8 pp.

"File:ER Diagram MMORPG.png." *Wikipedia, The Free Encyclopedia.*, Wikimedia Foundation, Inc. Retrieved Feb. 6, 2013 from http://en.wikipedia.orq/wiki/File:ER_Diagram_MMORPG.png, 4 pp.

"NoSQL." *Wikipedia, The Free Encyclopedia.*, Wikimedia Foundation, Inc. Retrieved Feb. 6, 2013 from http://en.wikipedia.org/wiki/NoSQL, 9 pp.

McKnight, "Improving Data Quality Through Data Modeling", McKnight Consulting Group, retrieved Feb. 6, 2013 from http://wvvw.slideshare.net/wmcknight/data-guality-mc-knight-e-rwin, 9 pp.

Piscopo, "ERwin® in the Cloud: How Data Modeling Supports Database as a Service (DaaS) Implementations", Retrieved Feb. 6, 2013 from http://erwin.com/content/whitepapers/ERwin_Cloud.pdf, 4 pp.

* cited by examiner

Abstract Sub-Model 1 (ASM1)

Figure 3B

Abstract Sub-Model 2 (ASM2)

Interface $I_1$

Interface $I_2$

Figure 4

Connection C

Interface $I_1$

Unified Structure

ASM1    Interface $I_2$    ASM2

DATA SOURCE MODELING METHODS FOR HETEROGENEOUS DATA SOURCES AND RELATED COMPUTER PROGRAM PRODUCTS AND SYSTEMS

BACKGROUND

The present disclosure relates to computer systems, and more specifically, to methods of data modeling and related computer program products and systems.

A modeling tool is an application that creates symbolic representations of the components in a specific area of knowledge or activity to help visualize the concepts of that area and operations that can be performed on the components. A software designer, for example, may use a modeling tool to model a software application before coding. A modeling tool helps the designer to specify, visualize, and document models of software systems, including structures and designs, in a way that meets the requirements of a given software project. Of course, modeling tools may be used for business modeling and modeling of other non-software systems too.

Currently, a broad variety of modeling tools exists, with each tool usually targeting one or more specific problem domains. Examples of problem domains include relational database domains, software development domains, etc. Such modeling tools generally enable a user to manipulate concepts related to their problem domain in ways that aid in analysis and provide a level of automation in gathering and exploiting their model data. A set of model data, for example, may include data components such as objects and properties that make up the model.

A modeling tool, such as the CA ERwin® Data Modeler r8, provides these features for the problem domain of relational databases, and enables a user to manipulate components of the relational databases, such as tables, columns, and indices. A modeling tool may thus be used to help visualize concepts using symbolic representations, and more particularly, to develop a data model representing a database and attributes/properties associated with the database. The CA ERwin® Data Modeler r8, for example, provides visualization of complex data structures, design layer architecture, standards definition, large model management, complete compare, database design generation, data warehouse and data mart design, reporting and printing, and integration and metadata exchange with other tools.

Data modeling tools are discussed, for example, in: U.S. Pub. No. 2005/0160401 entitled "System And Method For Adding User-Defined Objects To A Modeling Tool"; U.S. Pub. No. 2005/0165724 entitled "System And Method For Using An XML File To Control XML To Entity/Relationship Transformation"; U.S. Pub. No. 2008/0141215 entitled "Computer Readable Medium And Methods For Filtering A Dynamic Comparison Model"; McNight, William, "Improving Data Quality Through Data Modeling," CA Technologies, www.ERwin.com, 9 pages, 2010; and Piscopo, Nuccio, "Erwin® In The Cloud: How Data Modeling Supports Database as a Service (DaaS) Implementations," CA Technologies, www.ERwin.com, 4 pages, 2011. The disclosures of each of the above referenced documents are hereby incorporated herein in their entireties by reference.

BRIEF SUMMARY

According to one aspect of the present disclosure, a method of generating a data source model for heterogeneous data sources may include defining a first interface for a first abstract sub-model of a first sub-model without defining a data source structure for the first sub-model responsive to user input through a user interface, and defining a second interface for a second abstract sub-model of a second sub-model without defining a data source structure for the second sub-model responsive to user input through the user interface. A connection may be defined between the first interface of the first abstract sub-model and the second interface of the second abstract sub-model. A first data source structure may be defined for the first sub-model with the first data source structure defining a coupling to the first interface of the first abstract sub-model, and a second data source structure may be defined for the second sub-model with the second data source structure defining a coupling to the second interface. After defining the first and second data source structures for the first and second sub-models, a unified data source model may be generated including the first and second sub-models having the respective first and second data source structures and having the respective first and second interfaces of the first and second abstract sub-models, with the first and second sub-models being coupled through the connection defined between the respective first and second interfaces of the first and second abstract sub-models.

The unified data source model may be rendered on a display. Moreover, the first and second data source structures are heterogeneous data source structures having respective different data source structure types.

According to another aspect of the present disclosure, a computer program product providing data source modeling for heterogeneous data sources including a computer readable storage medium having computer readable program code embodied therein. The computer readable program code may include computer readable program code to define a first interface for a first abstract sub-model of a first sub-model without defining a data source structure for the first sub-model responsive to user input through a user interface. The computer readable program code may include computer readable program code to define a second interface for a second abstract sub-model of a second sub-model without defining a data source structure for the second sub-model responsive to user input through the user interface. The computer readable program code may include computer readable program code to define a connection between the first interface of the first abstract sub-model and the second interface of the second abstract sub-model. The computer readable program code may include computer readable program code to define a first data source structure for the first sub-model wherein the first data source structure defines a coupling to the first interface of the first abstract sub-model. The computer readable program code may include computer readable program code to define a second data source structure for the second sub-model wherein the second data source structure defines a coupling to the second interface. The computer readable program code may include computer readable program code to generate a unified data source model after defining the first and second data source structures for the first and second sub-models, the unified data source model including the first and second sub-models having the respective first and second data source structures and having the respective first and second interfaces of the first and second abstract sub-models, wherein the first and second sub-models are coupled through the connection defined between the respective first and second interfaces of the first and second abstract sub-models.

According to still another aspect of the present disclosure, a data source modeling system for heterogeneous data sources includes a processor and a memory coupled to the processor, with the memory including computer readable program code embodied in the memory. When executed by the processor the computer readable program code causes the processor to perform operations including: defining a first interface for a first abstract sub-model of a first sub-model without defining a data source structure for the first sub-model responsive to user input through a user interface; defining a second interface for a second abstract sub-model of a second sub-model without defining a data source structure for the second sub-model responsive to user input through the user interface; defining a connection between the first interface of the first abstract sub-model and the second interface of the second abstract sub-model; defining a first data source structure for the first sub-model wherein the first data source structure defines a coupling to the first interface of the first abstract sub-model; defining a second data source structure for the second sub-model wherein the second data source structure defines a coupling to the second interface; and after defining the first and second data source structures for the first and second sub-models, generating a unified data source model including the first and second sub-models having the respective first and second data source structures and having the respective first and second interfaces of the first and second abstract sub-models, wherein the first and second sub-models are coupled through the connection defined between the respective first and second interfaces of the first and second abstract sub-models.

BRIEF DESCRIPTION OF THE DRAWINGS

Aspects of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

Data modeling/design tools may be used to manage data models for relatively complex data definitions and relationships, and these modeling/design tools may provide a relatively high level of performance for single target databases. Data sizes, data formats, and data sources used by businesses are growing rapidly, different sources of data generation (e.g., mobile clients, websites, desktop computers, servers, etc.) are generating different formats of data, and new service models (such as cloud computing, Not only Structured Query Language or NoSQL databases, etc.) are providing architectures for applications using multiple heterogeneous data sources and/or components. Heterogeneous data sources may include traditional database sources, unstructured data sources (e.g., NoSQL sources), distributed computing platform sources (e.g., Hadoop®), cloud service platforms (e.g., Salesforce.com), etc. Data model sizes are thus increasing rapidly. With increasing data model sizes, it may be desirable for enterprises/businesses to visually design large data models, to distribute development of large data models across multiple developers, to partially design large data models with periodic synch-up mechanisms, to deploy data models/modeling in the cloud for mobile use, etc.

In data modeling, an Object Oriented Data Model (OODM) is black box of data model that exposes relationship dependency/dependencies using a defined interface(s). An Object Oriented Data Model can define an interface for an external data relationship, such as foreign key and loose data links. An interface is a logical/physical endpoint of a relationship which refers to a key of an internal entity and which exposes an external endpoint for an interface connector to an adapter (also referred to as a sub-model). Once a model part (also referred to as a sub-model) is loaded into a larger hosting model (also referred to as a unified data source model), the model part is connected by an interface connector for the relationship in the real model target on the real database. An interface connector (also referred to as an interface connection) is provided to build a connectivity relationship between two interface endpoints (of respective sub-models), and the interface connector maps the data type and simulates a relationship in the corresponding real database. The connector may be hosted in a hosting model.

An Object Oriented Data Model can also define an independent database target server and context. By way of example, a sub-model can be defined for an Oracle® database, and the sub-model for the Oracle database can be connected with another sub-model for a Salesforce® cloud database using an interface/connector. Using modeling tools disclosed herein for heterogeneous data sources, an Oracle® database and a Salesforce® cloud database may be modeled together (using respective sub-models) to provide an overall view in a picture provided by the unified data source model (also referred to as a host model).

An Object Oriented Data Model according to some embodiments disclosed herein can open a sub-model for read and save a sub-model for write independently of other sub-models of the same unified model. Moreover, a sub-model (of a unified data source model including multiple sub-models) may be opened/saved as a single file. Moreover, a single sub-model (of a unified model including multiple sub-models) may be hosted in single instance of an operating system, and a sub-model (of a unified model including multiple sub-models) may wrap an interface with a network message. Moreover, each sub-model of a unified data source model may be separately hosted using respective different instances of an operating system. An OODM may maintain data changes by itself including interface changes, and/or provide diagramming and/or semantic service.

The hosting model is a unified data source model (also referred to as a main model) including multiple sub-models that may be provided for a specific business goal(s), and the hosting model may have multiple sub-model adapters with corresponding connectors, and the hosting model may support partial loading and saving for multiple sub-models. An abstract sub-model (e.g., an OODM Model Adapter which represents an Object Oriented Data Model with interface definition) can be an empty (i.e., provided without a defined data structure/structures) abstract sub-model that is provided only for interface definition. An abstract sub-model can then point to a specific implemented sub-model and load from a specific source if the container has valid Interface Connector to connect to that sub-model.

Figure 1A:
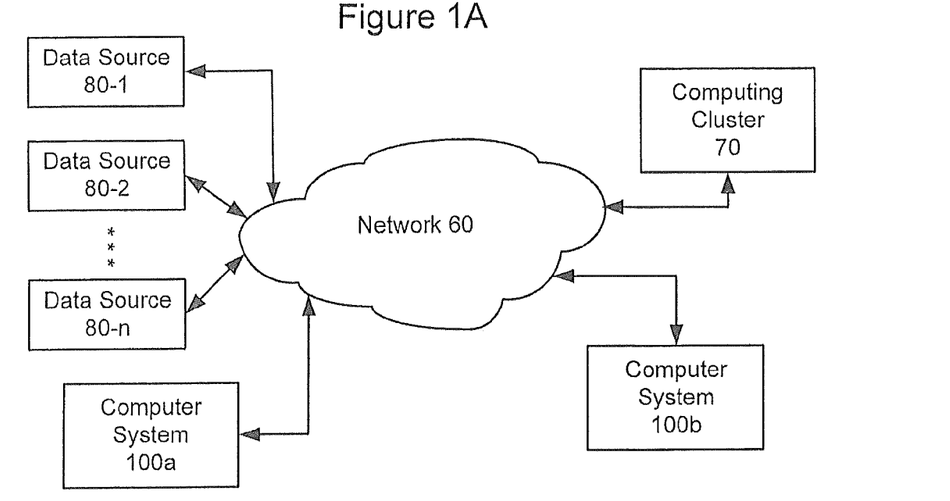
FIG. 1A is a schematic diagram illustrating a network environment in which data modeling according to some embodiments disclosed herein may be provided.

FIG. 1A is a schematic diagram illustrating a network environment in which data modeling according to some embodiments disclosed herein may be provided. As shown in FIG. 1A, a plurality of data sources 80-1 to 80-n may be coupled with/through network 60 (e.g., including one or more of a local area network LAN, a wide area network WAN, the Internet, etc.), and data source modeling may be provided using one or more of computer systems 100a/100b and/or computing cluster 70. Moreover, data sources 80-1 to 80-n may be heterogeneous data sources such that at least two of the data sources have different data source structure types. A first one of the data sources, for example, may have first data structure selected from one of a relational database structure, a key-value database structure, a structured query language (SQL) database structure, a Not only SQL (NoSQL) database structure, a non-database raw file structure, or a database table structure, and a second one of the data sources may have second data structure (different than the first data structure) selected from another of a relational database structure, a key-value database structure, a structured query language (SQL) database structure, a Not only SQL (NoSQL) database structure, a non-database raw file structure, or a database table structure.

Figure 1B:
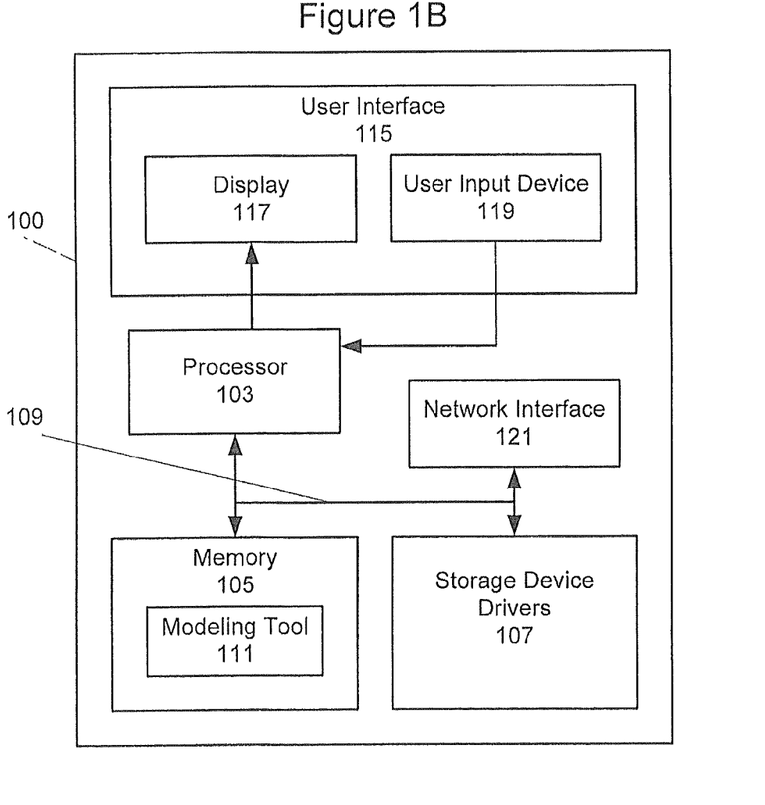
FIG. 1B is a block diagram illustrating a data source modeling system according to some embodiments disclosed herein.

FIG. 1B is a block diagram of a computer system 100 that may be used to implement data modeling methods (in whole or in part) according to some embodiments disclosed herein. Computer system 100 of FIG. 1B may be implemented as one of computer system 100a or computer system 100b of FIG. 1A. Computer system 101, for example, may be a personal computer, a workstation, or any other computing device, capable of executing a modeling tool program. Moreover, computer system 101 may include processor 103, memory 105, network interface 121 providing an interface to network 60, and storage device drivers 107 to access more permanent storage devices (such as a hard disk, a removable floppy disk, a DVD, a CD, or any other storage device). Processor 103, memory 105, network interface 121, and storage device drivers 107 may be connected via a bus 109. Moreover, a program implementing a modeling tool as discussed in greater detail below may be stored in memory 111, and memory 111 may be configured to load at least a portion of the program implementing the modeling tool for execution by processor 103. In addition, computer system 101 may include user interface 115 coupled to processor 103 with user interface 115 including display 117 and user input 119 (e.g., a keyboard, mouse, pointing device, etc.).

Figure 2:
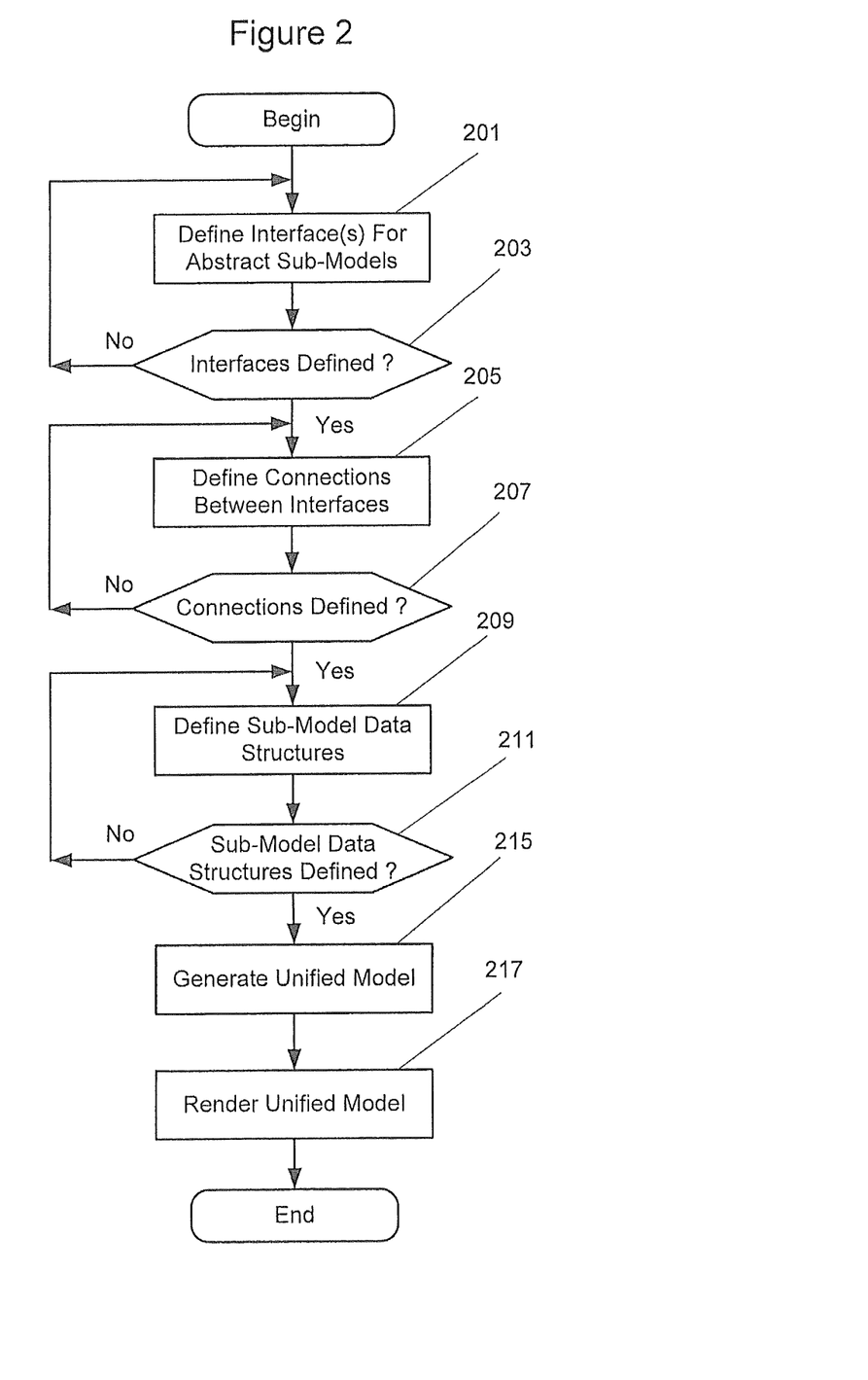
FIG. 2 is a flow chart illustrating operations of data source modeling systems of FIGS. 1A and/or 1B.

FIG. 2 is a flow diagram illustrating operations of processor 103 (of one or more systems 100) providing data source modeling according to some embodiments disclosed herein. Operations of FIG. 2, for example, may be used to generate a unified data source model for two heterogeneous data sources (e.g., data sources 80-1 and 80-2) having different data source structure types as discussed in greater detail below with respect to FIGS. 3A-B, 4, 5A-B, and 6.

Figures 3A, 3B:
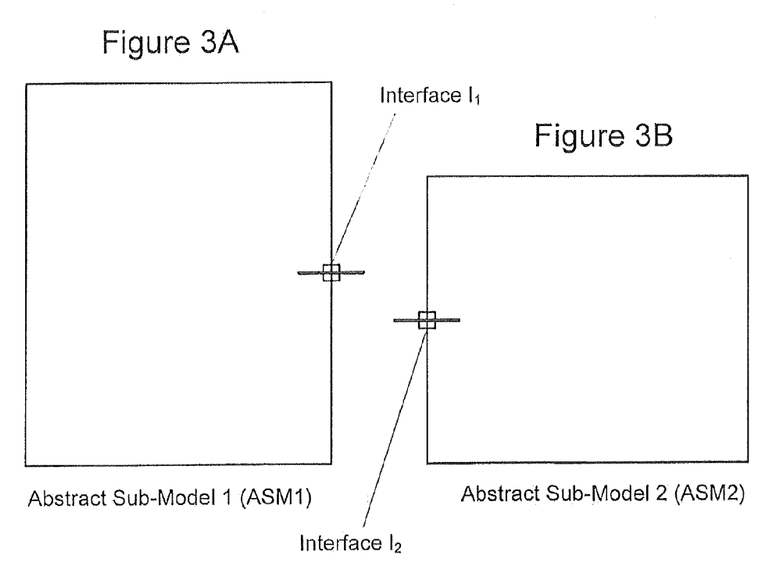
FIGS. 3A-B, 4, 5A-B, and 6 illustrate operations of data source modeling with two sub-models according to the flow chart of FIG. 2.

As shown in FIG. 3A, processor 103 may define a first sub-model interface $I_1$ for a first abstract sub-model ASM1 of a first sub-model (SM1) at block 201 of FIG. 2 without defining a data source structure for the first sub-model responsive to user input received through user input device 119 (e.g., including a mouse, keyboard, etc.) of user interface 115. Processor 103 may repeat operations of block 201 until all interfaces for all abstract sub-models of the unified model have been defined at block 203. In the example of FIGS. 3A-B, 4, 5A-B, and 6, processor 103 may define a second interface $I_2$ for a second abstract sub-model ASM2 of a second sub-model (SM2) at block 203 without defining a data source structure for the second sub-model responsive to user input through the user interface 115. Each of the resulting abstract sub-models ASM1 and ASM2 of FIGS. 3A and 3B may thus be an OODM Model Adapter (representing an Object Oriented Data Model with interface definition) that is an empty abstract sub-model provided only for interface definition. An abstract sub-model can then point to a specific implemented sub-model (discussed below) and load from a specific source if the abstract sub-model has a valid Interface Connector to connect to that sub-model.

Figure 4:
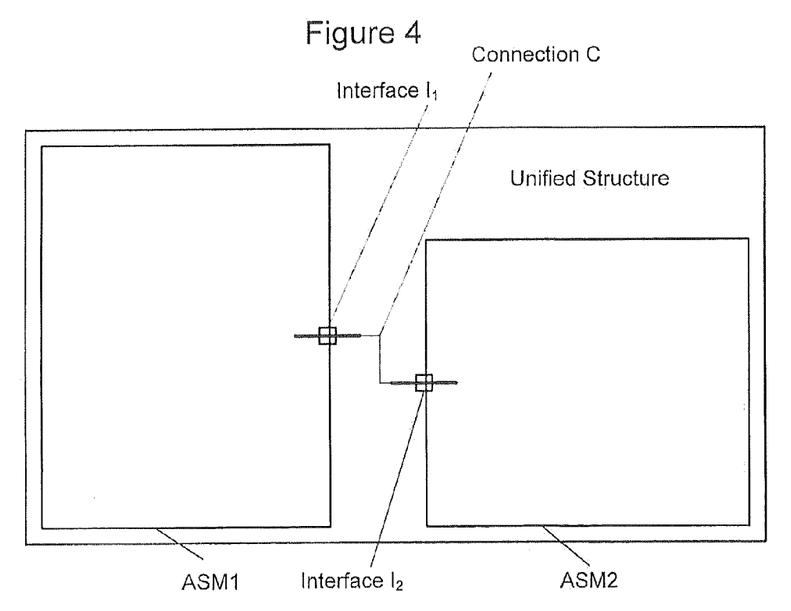

At block 205, processor 103 may define a connection C between the first interface $I_1$ and the second interface $I_2$ of the respective first and second abstract sub-models ASM1 and ASM2 as shown in FIG. 4. The connection C may be defined, for example responsive to user input received through user input device 119 of user interface 115. Processor 103 may repeat operations of block 205 until all connections for all interfaces of the unified model have been defined at block 207. The resulting abstract sub-models ASM1 and ASM2, interfaces $I_1$ and $I_2$, and connection C may thus define a unified structure for the unified data source model as shown in FIG. 4 without defining data source structures of the abstract sub-models ASM1 and ASM2 or corresponding sub-models SM1 and SM2. The unified structure of FIG. 4 (including abstract sub-models ASM1 and ASM2, interfaces $I_1$ and $I_2$, and connection C) may thus be saved as a file and/or opened separate from files used to save/open sub-models discussed below. The unified structure of FIG. 4, for example, may be saved/opened as a file in memory 103 of computer system 100, in memory of another computer system, in memory of a node of computing cluster 70, etc.

Figures 5A, 5B:
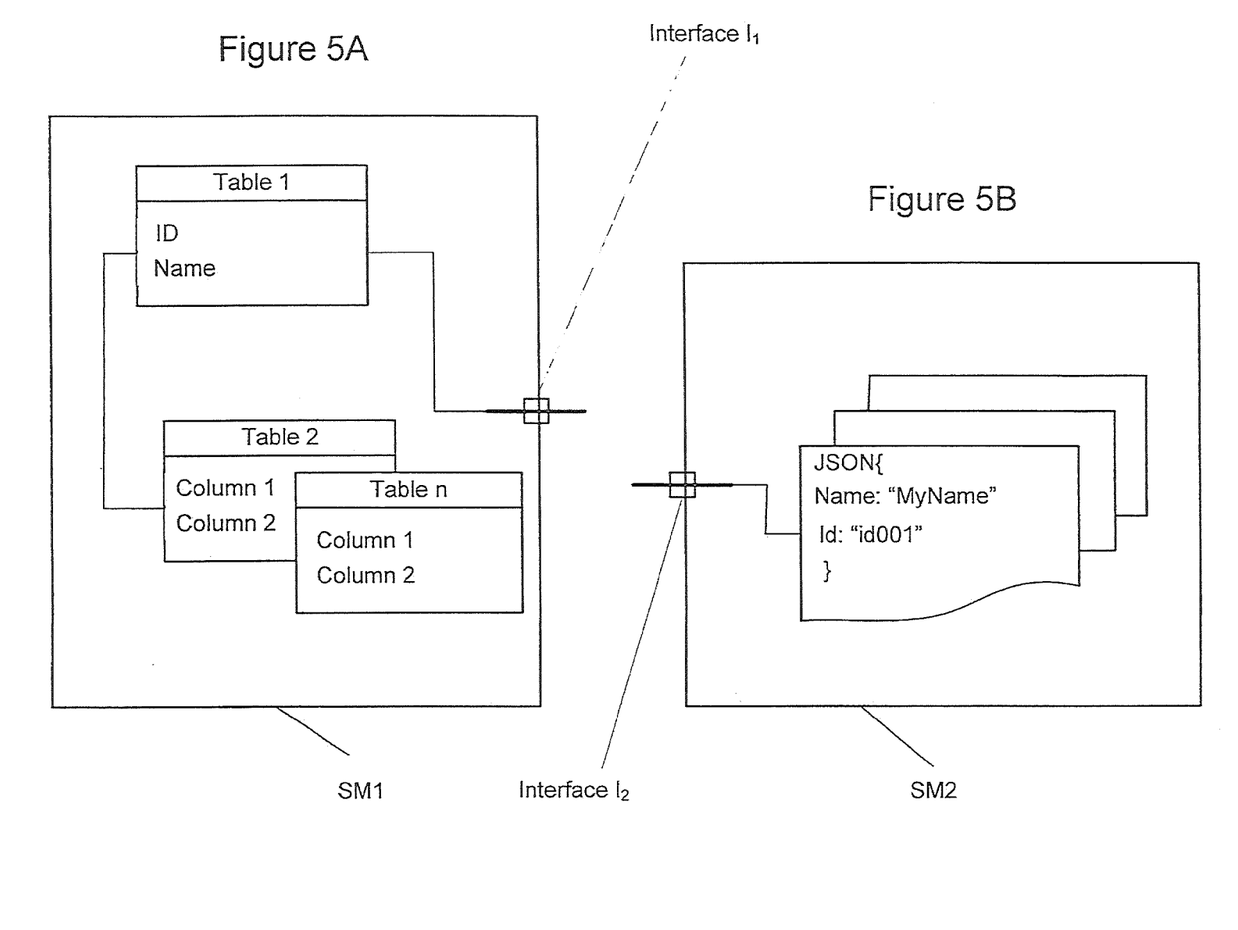

At block 209, processor 103 may define a first data source structure DS1 for the first sub-model SM1 responsive to user input received through user input device 119 of user interface 115 as shown in FIG. 5A. Moreover, the first data source structure DS1 may define a coupling to the first interface $I_1$ of the first abstract sub-model ASM1. In the example, of FIG. 5A, the first data source structure DS1 may be a database table structure including a plurality of interconnected tables. The data source structure DS1 of FIG. 5A, however, may define any one of a relational database structure, a key-value database structure, a structured query language (SQL) database structure, a Not only SQL database structure, non-database file structure (e.g., a non-database raw file structure), a database table structure, etc. Processor 103 may repeat operations of block 209 until data structures for all sub-models of the unified data source model have been defined at block 211.

In the example of FIGS. 3A-B, 4, 5A-B, and 6, processor 103 may define a second data source structure DS2 for the second sub-model SM2 responsive to user input received through user input device 119 of user interface 115 as shown in FIG. 5B, and the data source structure DS2 may define a coupling to the second interface $I_2$ of the second abstract sub-model ASM2. In the example of FIG. 5B, the second data source structure DS2 may be a non-database raw file structure including a plurality of files. The data source structure DS1 of FIG. 5B, however, may define any one of a relational database structure, a key-value database structure, a structured query language (SQL) database structure, a Not only SQL database structure, non-database file structure (e.g., a non-database raw file structure), a database table structure, etc., different than the data source structure of FIG. 5A. Stated in other words, the first and second data source structures DS1 and DS2 may be heterogeneous data source structures having respective different data source structure types.

The unified structure of FIG. 4, the sub-model SM1 of FIG. 5A, and the sub-model SM2 of FIG. 5B may be developed separately (e.g., using different instances of an operating system) using the same or different computer system or systems, and the unified structure of FIG. 4, the sub-model SM1 of FIG. 5A, and the sub-model SM2 of FIG. 5B may be saved as different files in memory of the same or different computer system or systems. Once the unified structure of FIG. 4 is defined at blocks 201 and 203, for example, the sub-models SM1 and SM2 may be developed separately on the same or different computer systems. The unified structure of FIG. 4, the sub-model SM1 of FIG. 5A, and the sub-model SM2 of FIG. 5B, for example, may be saved as different files at the same or different nodes of computing cluster 70 allowing separate development of the sub-models SM1 and SM2 at the same or different computing systems 100a and 100b.

Figure 6:
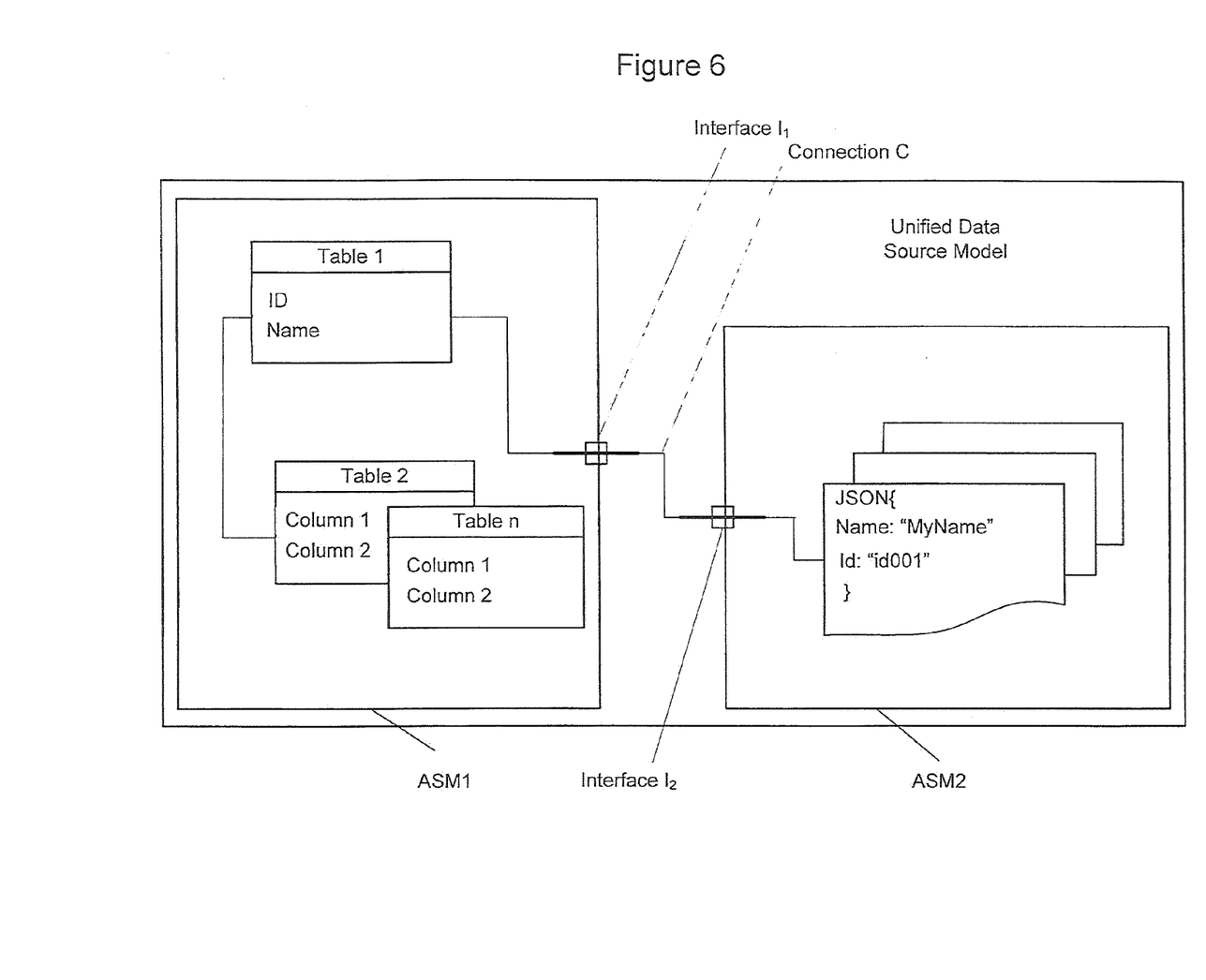

After defining the first and second data source structures for the first and second sub-models SM1 and SM2, processor 103 may generate a unified data source model (also referred to as a host model) at block 215 as shown in FIG. 6. More particularly, the unified data source model may include the first and second sub-models SM1 and SM2 having the respective first and second data source structures DS1 and DS2 and having the respective first and second interfaces $I_1$ and $I_2$ of the first and second abstract sub-models ASM1 and ASM2. The first and second sub-models SM1 and SM2 are thus coupled through the connection C defined between the respective first and second interfaces $I_1$ and $_2$ of the first and second abstract sub-models ASM1 and ASM2. At block 217, the unified data source model of FIG. 6 may be rendered on display 117 (of user interface 15) of computer system 100.

As discussed above with respect to FIGS. 2, 3A-B, 4, 5A-B, and 6, operations of FIG. 2 may support generation of a unified data source model including two sub-models (for heterogeneous data sources) with a connection there between. Operations of FIG. 2, however, may be used to generate unified data source models including any number of sub-models with any number of connections there between. Operations of FIG. 2, for example, may be used to generate a unified data source model for three heterogeneous data sources (e.g., data sources 80-1, 80-2, and 80-n) having different data source structure types as discussed in greater detail below with respect to FIGS. 7A-B, 8, 9A-B, and 10.

Figures 7A, 7B, 7C:
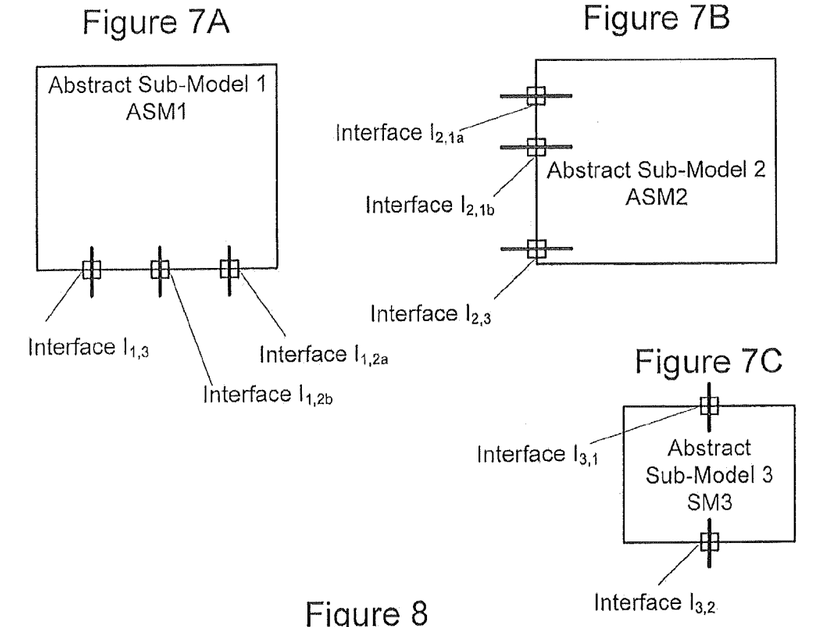
FIGS. 7A-C, 8, 9A-C, and 10 illustrate operations of data source modeling with three sub-models according to the flow chart of FIG. 2.

As shown in FIG. 7A, processor 103 may define three sub-model interfaces $I_{1,\,2a}$, $I_{1,\,2b}$, and $I_{1,3}$ for a first abstract sub-model ASM1 of a first sub-model (SM1) at block 201 of FIG. 2 without defining a data source structure for the first sub-model responsive to user input received through user input device 119 (e.g., including a mouse, keyboard, etc.) of user interface 115. Processor 103 may repeat operations of block 201 until all interfaces for all abstract sub-models of the unified model have been defined at block 203. In the example of FIGS. 7A-C, 8, 9A-C, and 10, processor 103 may define three interface $I_{2,1a}$, $I_{2,1b}$, and $I_{2,3}$ for a second abstract sub-model ASM2 of a second sub-model (SM2) at block 203 (shown in FIG. 7B) without defining a data source structure for the second sub-model responsive to user input through the user interface 115. Processor 103 may also define three interface $I_{3,1}$, and $I_{3,1}$ for a third abstract sub-model ASM3 of a third sub-model (SM3) at block 203 (shown in FIG. 7C) without defining a data source structure for the third sub-model responsive to user input through the user interface 115.

Each of the resulting abstract sub-models ASM1, ASM2, and ASM3 of FIGS. 7A-C may thus be an OODM Model Adapter (representing an Object Oriented Data Model with interface definition) that is an empty abstract sub-model provided only for interface definition. An abstract sub-model can then point to a specific implemented sub-model (discussed below) and load from a specific source if the abstract sub-model has a valid Interface Connector to connect to that sub-model.

Figure 8:
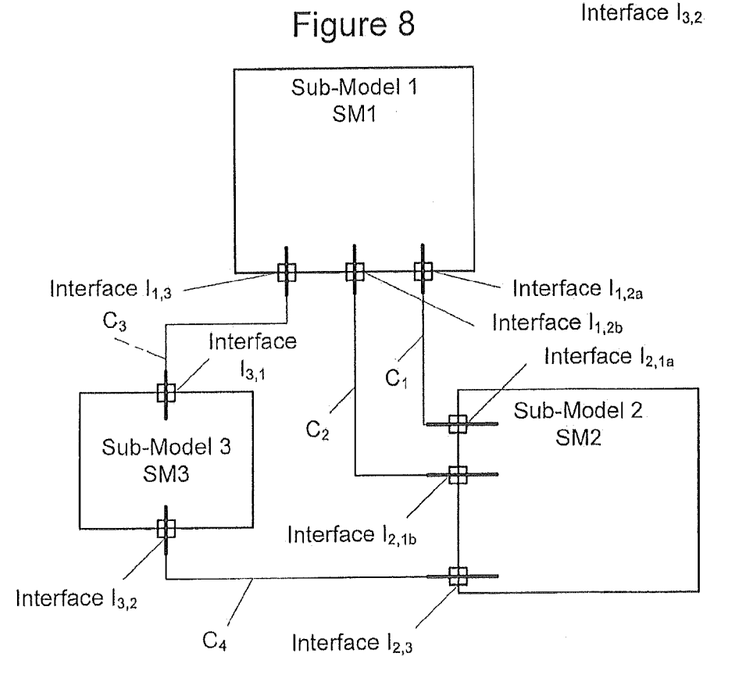

At block 205, processor 103 may define connections $C_1$, $C_2$, $C_3$, and $C_4$ between the respective interfaces of abstract sub-models ASM1, ASM2, and ASM3, as shown in FIG. 8. The connections may be defined, for example responsive to user input received through user input device 119 of user interface 115. Processor 103 may repeat operations of block 205 until all connections for all interfaces of the unified model have been defined at block 207. The resulting abstract sub-models ASM1 and ASM2, interfaces, and connections may thus define a unified structure for the unified data source model as shown in FIG. 8 without defining data source structures of the abstract sub-models ASM1, ASM2, and ASM3 or corresponding sub-models SM1, SM2, and SM3. The unified structure of FIG. 8 (including abstract sub-models, interfaces, and connections) may thus be saved as a file and/or opened separate from files used to save/open sub-models discussed below. The unified structure of FIG. 8, for example, may be saved as a file in memory 103 of computer system 100, in memory of another computer system, in memory of a node of computing cluster 70, etc.

Figure 9A:
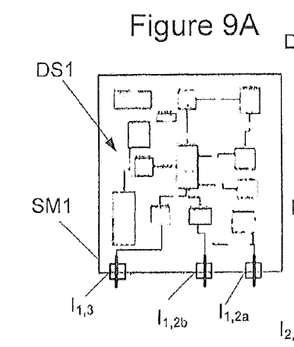

At block 209, processor 103 may define a first data source structure DS1 for the first sub-model SM1 responsive to user input received through user input device 119 of user interface 115 as shown in FIG. 9A, and the first data source structure DS1 may define a coupling to the interfaces $I_{1,2a}$, $I_{1,2b}$, and $I_{1,3}$ of the first abstract sub-model ASM1. The data source structure DS1 of FIG. 9A may define any one of a relational database structure, a key-value database structure, a structured query language (SQL) database structure, a Not only SQL database structure, non-database file structure (e.g., a non-database raw file structure), a database table structure, etc. Processor 103 may repeat operations of block 209 until data structures for all sub-models of the unified data source model have been defined at block 211.

Figures 9B, 9C:
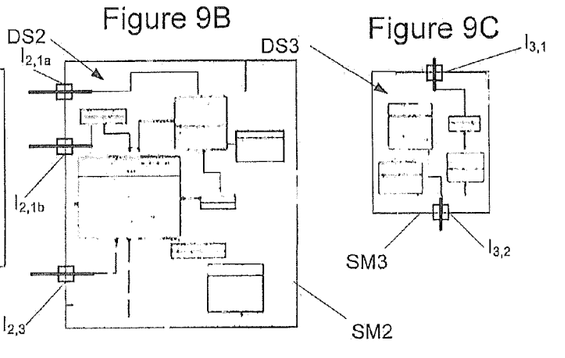

In the example of FIGS. 7A-C, 8, 9A-C, and 10, processor 103 may define a second data source structure DS2 for the second sub-model SM2 responsive to user input received through user input device 119 of user interface 115 as shown in FIG. 9B, and the data source structure DS2 may define a coupling to interfaces $I_{2,1a}$, $I_{2,1b}$, and $I_{2,3}$ of the second abstract sub-model ASM2. The data source structure DS2 of FIG. 9B may define any one of a relational database structure, a key-value database structure, a structured query language (SQL) database structure, a Not only SQL database structure, non-database file structure (e.g., a non-database raw file structure), a database table structure, etc., different than the data source structure of FIG. 9A.

Processor 103 may also define a third data source structure DS3 for the third sub-model SM3 responsive to user input received through user input device 119 of user interface 115 as shown in FIG. 9C, and the data source structure DS3 may define a coupling to interfaces $I_{3,1}$, and $I_{3,2}$ of the third abstract sub-model ASM3. The data source structure DS3 of FIG. 9C may define any one of a relational database structure, a key-value database structure, a structured query language (SQL) database structure, a Not only SQL database structure, non-database file structure (e.g., a non-database raw file structure), a database table structure, etc., different than at least one of the data source structures of FIGS. 9A and 9B. Stated in other words, data source structures DS1, DS2, and DS3 may be heterogeneous data source structures having respective different data source structure types for different data source types.

The unified structure of FIG. 8 and the sub-models of FIG. 9-C may be developed separately (e.g., using different instances of an operating system) using the same or different computer system or systems, and the unified structure of FIG. 8 and the sub-models of FIGS. 9A-C may be saved as different files in memory of the same or different computer system or systems. Once the unified structure of FIG. 8 is defined at blocks 201 and 203, for example, the sub-models of FIGS. 9A-C may be developed separately on the same or different computer systems. The unified structure of FIG. 8 and the sub-models of FIGS. 9A-C, for example, may be saved as different files at the same or different nodes of computing cluster 70 allowing separate development of the sub-models SM1, SM2, and SM3 at the same or different computing systems 100a and 100b.

Figure 10:
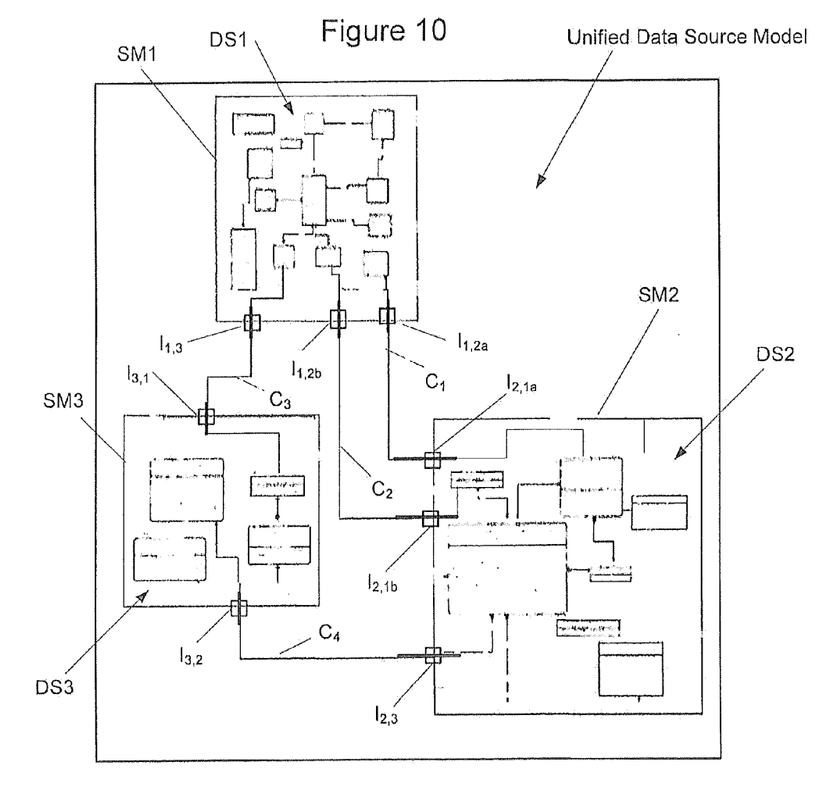

After defining the data source structures for the sub-models SM1, SM2, and SM3, processor 103 may generate a unified data source model (also referred to as a host model) at block 215 as shown in FIG. 10. More particularly, the unified data source model may include sub-models SM1, SM2, and SM3 having the respective data source structures DS1, DS2, and DS3 and having the respective interfaces of the abstract sub-models ASM1, ASM2, and ASM3. The sub-models SM1, SM2, and SM3 are thus coupled through the connections defined between the interfaces of the respective abstract sub-models. At block 217, the unified data source model of FIG. 10 may be rendered on display 117 (of user interface 15) of computer system 100.

By providing a unified data source model using sub-models that may be separately designed, loaded, updated, etc., the unified data source model may be separated into smaller sub-models to allow parallel development based on raw interface definitions of model/sub-model architecture.

Design of separate sub-models of a same unified data source model may be facilitated using a standard interface. Accordingly, portions (sub-models) of the unified data source model may be developed separately without strong dependency except for the interface(s) between the sub-models. The separate design of sub-models may lead to better design, and/or reduces cost to maintain the unified model.

The unified data source model may be distributed across a computing cluster with different sub-models of the unified data source model distributed across different computing nodes of the computing cluster. It may be possible to deploy each sub-model on a node in a computing cluster by wrapping the Interface Connector(s) with TCP/IP (Transmission Control Protocol and Internet Protocol). In this way, the unified data source model including multiple sub-models may be run on a cloud model service, and a user may not need to install a desktop application. Instead, a user may only need to access a website which presents a relatively small portion (e.g., a sub-model or sub-models) of a unified data source model.

Sub-model level reuse and flexibility may allow use of some sub-models for different unified models (instead of importing tables from files).

Data from different data platforms/sources (e.g., heterogeneous data sources) may be modeled into a single unified data source model using different sub-models for the different data platforms/sources. An application might have data from local files, different databases, cloud sources, etc, and a unified model of the data from the different sources may be designed and viewed in a whole model, thereby allowing the enterprise/business to manage the data with more intelligence.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer implemented method of generating a data source model for heterogeneous data sources, the method comprising:

defining a first interface for a first abstract sub-model of a first sub-model without defining a data source structure for the first sub-model responsive to user input through a user interface;

defining a second interface for a second abstract sub-model of a second sub-model without defining a data source structure for the second sub-model responsive to user input through the user interface;

defining a connection between the first interface of the first abstract sub-model and the second interface of the second abstract sub-model;

defining a first data source structure for the first sub-model separately from the first abstract sub-model, wherein the first data source structure defines a coupling to the first interface of the first abstract sub-model;

defining a second data source structure for the second sub-model separately from the second abstract sub-model, wherein the second data source structure defines a coupling to the second interface, wherein the first and second data source structures are heterogeneous data source structures having respective different data source structure types, and wherein at least one of the first and second data source structure types comprises a database structure;

after defining the first and second data source structures for the first and second sub-models, generating, by a processor, a unified data source model including the first and second sub-models having the respective first and second data source structures and having the respective first and second interfaces of the first and second abstract sub-models, wherein the first and second sub-models are coupled through the connection defined between the respective first and second interfaces of the first and second abstract sub-models; and rendering the unified data source model including the first and second sub-models having the respective first and second data source structures and coupled through the connection defined between the first and second interfaces on a display.

2. The computer implemented method of claim 1 wherein the first data source structure type of the first data source structure comprises a relational database structure, and wherein the second data source structure type of the second data source structure comprises a key-value database structure.

3. The computer implemented method of claim 1 wherein the first data source structure type of the first data source structure comprises a structured query language database structure, and wherein the second data source structure type of the second data source structure comprises a NoSQL database structure.

4. The computer implemented method of claim 1 wherein the first data source structure type of the first data source structure comprises a database structure, and wherein the second data source structure type of the second data source structure comprises a non-database file structure.

5. The computer implemented method of claim 4 wherein the first data source structure type of the first data source structure comprises a database table structure.

6. The computer implemented method of claim 4 wherein the first data source structure type of the first data source structure comprises a database table structure, and wherein the second data source structure type of the second data source structure comprises non-database raw file structure.

7. The computer implemented method of claim 1 further comprising:
defining a third interface for the first abstract sub-model of the first sub-model without defining a data source structure for the first sub-model responsive to user input through the user interface;
defining a fourth interface for the second abstract sub-model of the second sub-model without defining a data source structure for the second sub-model responsive to user input through the user interface; and
defining a connection between the third interface of the first abstract sub-model and the fourth interface of the second abstract sub-model;
wherein generating the unified data source model comprises generating the unified data source model including the first and second sub-models having the respective first and second data source structures, wherein the first and second sub-models are coupled through the connection between the first and second interfaces of the first and second abstract sub-models and through the connection between the third and fourth interfaces of the first and second abstract sub-models.

8. The computer implemented method of claim 1 further comprising:
defining a third interface for the first abstract sub-model of the first sub-model without defining a data source structure for the first sub-model responsive to user input through a user interface;
defining a fourth interface for a third abstract sub-model of a third sub-model without defining a data source structure for the third sub-model responsive to user input through the user interface;
defining a connection between the third interface of the first abstract sub-model and the fourth interface of the third abstract sub-model; and
defining a third data source structure for the third sub-model responsive to user input through the user interface wherein the third data source structure defines a coupling to the fourth interface of the third abstract sub-model;
wherein generating the unified data source model comprises generating the unified data source model including the first, second, and third sub-models having the respective first, second, and third data source structures, the first sub-model having the first and third interfaces of the first abstract sub-model, the third sub-model having the fourth interface of the third abstract sub-model, wherein the first and second sub-models are coupled through the connection between the first and second interfaces and wherein the first and third sub-models are coupled through the connection between the third and fourth interfaces.

9. A computer program product providing data source modeling for heterogeneous data sources, the computer program product comprising:
a non-transitory computer readable storage medium having computer readable program code embodied therein, the computer readable program code comprising:
computer readable program code to define a first interface for a first abstract sub-model of a first sub-model without defining a data source structure for the first sub-model responsive to user input through a user interface;
computer readable program code to define a second interface for a second abstract sub-model of a second sub-model without defining a data source structure for the second sub-model responsive to user input through the user interface;
computer readable program code to define a connection between the first interface of the first abstract sub-model and the second interface of the second abstract sub-model;
computer readable program code to define a first data source structure for the first sub-model separately from the first abstract sub-model, wherein the first data source structure defines a coupling to the first interface of the first abstract sub-model;
computer readable program code to define a second data source structure for the second sub-model separately from the second abstract sub-model, wherein the second data source structure defines a coupling to the second interface, wherein the first and second data source structures are heterogeneous data source structures having respective different data source structure types, and wherein at least one of the first and second data source structure types comprises a database structure;
computer readable program code to generate a unified data source model after defining the first and second data source structures for the first and second sub-models, the unified data source model including the first and second sub-models having the respective first and second data source structures and having the respective first and second interfaces of the first and second abstract sub-models, wherein the first and second sub-models are coupled through the connection defined between the respective first and second interfaces of the first and second abstract sub-models; and
computer readable program code to render the unified data source model including the first and second sub-models having the respective first and second data source structures and coupled through the connection between the first and second interfaces on a display.

10. The computer program product of claim 9 wherein the first data source structure type of the first data source structure comprises a relational database structure, and wherein the second data source structure type of the second data source structure comprises a key-value database structure.

11. The computer program product of claim 9 wherein the first data source structure type of the first data source structure comprises a structured query language (SQL) database structure, and wherein the second data source structure type of the second data source structure comprises a NoSQL database structure.

12. The computer program product of claim 9 wherein the first data source structure type of the first data source structure comprises a database structure, and wherein the second data source structure type of the second data source structure comprises non-database file structure.

13. A data source modeling system for heterogeneous data sources, the data source modeling system comprising:
  a processor; and
  a memory coupled to the processor and comprising computer readable program code embodied in the memory and when executed by the processor causes the processor to perform operations comprising:
    defining a first interface for a first abstract sub-model of a first sub-model without defining a data source structure for the first sub-model responsive to user input through a user interface;
    defining a second interface for a second abstract sub-model of a second sub-model without defining a data source structure for the second sub-model responsive to user input through the user interface;
    defining a connection between the first interface of the first abstract sub-model and the second interface of the second abstract sub-model;
    defining a first data source structure for the first sub-model separately from the first abstract sub-model, wherein the first data source structure defines a coupling to the first interface of the first abstract sub-model;
    defining a second data source structure for the second sub-model separately from the second abstract sub-model, wherein the second data source structure defines a coupling to the second interface, wherein the first and second data source structures are heterogeneous data source structures having respective different data source structure types, and wherein at least one of the first and second data source structure types comprises a database structure;
    after defining the first and second data source structures for the first and second sub-models, generating a unified data source model including the first and second sub-models having the respective first and second data source structures and having the respective first and second interfaces of the first and second abstract sub-models, wherein the first and second sub-models are coupled through the connection defined between the respective first and second interfaces of the first and second abstract sub-models; and
    rendering the unified model including the first and second sub-models having the respective first and second data source structures and coupled through the connection between the first and second interfaces on a display.

14. The data source modeling system of claim 13 wherein the first data source structure type of the first data source structure comprises a database structure, and wherein the second data source structure type of the second data source structure comprises non-database file structure.

15. The data source modeling system of claim 13 wherein the first data source structure type of the first data source structure comprises a first database structure, and wherein the second data source structure type of the second data source structure comprises a second database structure different than the first database structure.

* * * * *